(12) United States Patent
Wang et al.

(10) Patent No.: US 7,928,030 B2
(45) Date of Patent: Apr. 19, 2011

(54) MICROWAVE DIELECTRIC CERAMICS AND METHOD FOR MANUFACTURING THE SAME

(75) Inventors: Hong Wang, Xi'an (CN); Huanfu Zhou, Xi'an (CN); Xi Yao, Xi'an (CN); Ruey-Tzeng Chang, Kaohsiung (TW); Huey-Ru Chen, Kaohsiung (TW); Chung-Kai Wen, Taipei Hsien (TW)

(73) Assignee: Walsin Technology Corporation, Taipei (TW)

( * ) Notice: Subject to any disclaimer, the term of this patent is extended or adjusted under 35 U.S.C. 154(b) by 329 days.

(21) Appl. No.: 12/260,772

(22) Filed: Oct. 29, 2008

(65) Prior Publication Data

US 2010/0105538 A1    Apr. 29, 2010

(51) Int. Cl.
*C04B 35/00* (2006.01)
*C04B 35/64* (2006.01)

(52) U.S. Cl. .................. 501/135; 501/134; 264/666

(58) Field of Classification Search .................. 501/134, 501/135; 428/824, 824.2
See application file for complete search history.

(56) References Cited

U.S. PATENT DOCUMENTS
2003/0158031 A1*  8/2003  Isuhak et al. .................. 501/134

FOREIGN PATENT DOCUMENTS
CN     101050101 A    * 10/2007

OTHER PUBLICATIONS

Kim et al., "Degradation Mechanism of Dielectric Loss in Barium Niobate Under a Reducing Atmosphere", published Oct. 2006, Journal of the American Society, vol. 89, NOo 10, (pp. 3302-3304).*

* cited by examiner

*Primary Examiner* — Jerry Lorengo
*Assistant Examiner* — Lynne Edmondson
(74) *Attorney, Agent, or Firm* — WPAT, P.C.; Anthony King

(57) ABSTRACT

A method for manufacturing microwave dielectric ceramics has the steps of: mixing multiple A-metal compounds and sintering multiple A-metal compounds between 1350~1450° C. for 2~4 hr to make a first component $Ba_{5+y}(Nb_{1-k}Mn_k)_4O_{15}$; mixing and sintering multiple B-metal compounds to make a second component $Ba_{1+z}Nb_2O_6$; and mixing the first component $Ba_{5+y}(Nb_{1-k}Mn_k)_4O_{15}$, the second component $Ba_{1+z}Nb_2O_6$ and at least one sintering aid to make a third component $(1-x)Ba_{5+y}(Nb_{1-k}Mn_k)_4O_5$-$xBa_{1+z}Nb_2O_6$; wherein x, y, z and k are molar fractions and $0 \leq x < 1$, $0 < y \leq 0.3$, $0 \leq z \leq 0.3$, $0 \leq k \leq 0.1$; and the at least one sintering aid is 0.3~3 wt %. The microwave dielectric ceramics of $(1-x)Ba_{5+y}(Nb_{1-k}Mn_k)_4O_{15}$-$xBa_{1+z}Nb_2O_6$ have superior microwave properties, low sintering temperature, simple chemical composition and manufacturing requirements applicable to low temperature co-sintered ceramic systems so no re-tooling is required.

11 Claims, 1 Drawing Sheet ent invention relates to microwave dielectric ceramics and more particularly to microwave dielectric ceramics being sintered at low temperature and having improved microwave properties and a method of producing the same.

MICROWAVE DIELECTRIC CERAMICS AND METHOD FOR MANUFACTURING THE SAME

BACKGROUND OF THE INVENTION

1. Field of the Invention

The present invention relates to microwave dielectric ceramics and more particularly to microwave dielectric ceramics being sintered at low temperature and having improved microwave properties and a method of producing the same.

2. Description of the Prior Arts

Wireless communications devices comprise both passive and active components, the former in greater quantity that the latter. However, passive components are very expensive and may account for 70% of the cost of the communications device. Furthermore, integrating passive components allows miniaturized and lightweight communications devices. However, passive components generally comprise dielectric ceramics with very high sintering temperatures (in excess of 1300° C.) and electrodes. Therefore, silver or copper cannot be used. The electrodes must either be expensive platinum or silver palladium alloys.

Current research is directed toward microwave dielectric ceramics co-sintered with conductive metals, referred to as low temperature co-sintered ceramics (LTCC), and having the following advantages:

1. Low sintering temperature (less than 1000° C.).
2. Ceramics can be co-sintered with metals such as gold, silver and copper so forming ceramics with low impedance and low dielectric constant loss for lower cost.
3. A manufacture layer of the ceramic is not limited.
4. Resistors, capacitors and inductors are mounted in the ceramics.
5. Low thermal expansion coefficient and water absorption.

Therefore, LTCC is a good material for high-frequency communications components.

LTCC are classified by the major material of the ceramic, and include $BaO-TiO_2-Re_2O_3$, $Bi_2O_3$, $BaO-TiO_2$, $MgO-TiO_2$, $CaO-TiO_2$, $ZnO-TiO_2$, $Zn-SnO_2-TiO_2$, $BaO-WO_3-CuO$ and $CuO-ZrO_2$. An agent is added to the LTCC to promote a low melting point glass phase and reduce the sintering temperature of the ceramics. However, the agent can decrease microwave properties of the LTCC.

However, LTCC still has a high sintering temperature so remains costly and a highly energy dependent process.

To overcome the shortcomings, the present invention provides a microwave dielectric ceramics and method for manufacturing the same to mitigate or obviate the aforementioned problems.

SUMMARY OF THE INVENTION

The main objective of the present invention is to provide microwave dielectric ceramics being sintered at low temperature and having improved microwave properties and a manufacturing method thereof.

The manufacturing method of microwave dielectric ceramics comprises steps of: (a) mixing and sintering multiple A-metal compounds to form a first component; (b) mixing and calcining multiple B-metal compounds to form a second component; and (c) mixing and sintering the first and second components with at least one sintering aid to form the microwave dielectric ceramics.

The step of (a) mixing and sintering multiple A-metal compounds to form a first component is performed between 1250° C. and 1450° C. for two to four hours and the first component is $Ba_{5+y}(Nb_{1-k}Mn_k)_4O_{15}$.

The second component is $Ba_{1+z}Nb_2O_6$.

The dielectric ceramics is $(1-x)Ba_{5+y}(Nb_{1-k}Mn_k)_4O_{15}$-x $Ba_{1+z}Nb_2O_6$; wherein x, y, z and k is a mole fraction and $0 \leq x \leq 1$, $0 < y \leq 0.3$, $0 \leq z \leq 0.3$, $0 \leq k \leq 0.1$; and the sintering aid is 0.3 to 3 wt %.

The microwave dielectric ceramics of $(1-x)Ba_{5+y}(Nb_{1-k}Mn_k)_4O_{15}$-$xBa_{1+z}Nb_2O_6$ have superior microwave properties, low sintering temperature, simple chemical composition and manufacturing requirements applicable to low temperature co-sintered ceramic systems so no re-tooling is required.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
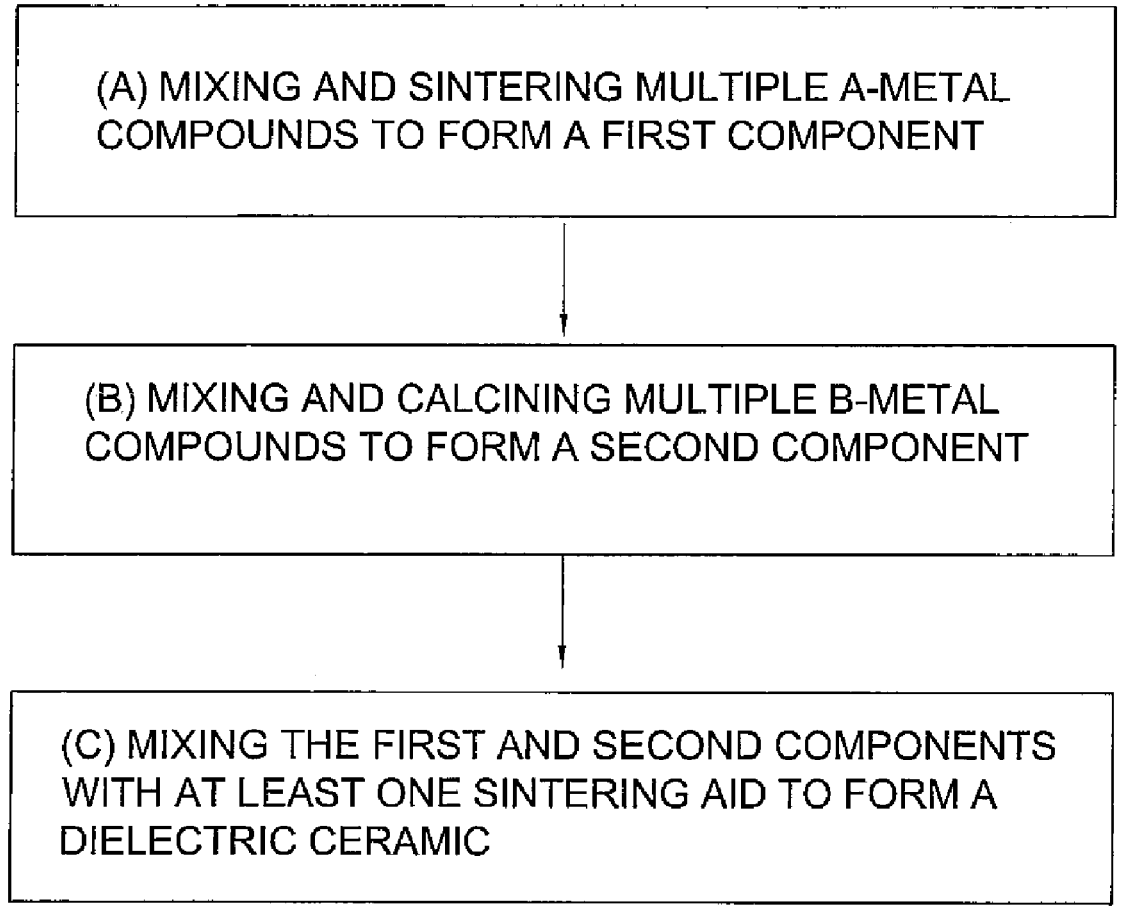
FIG. 1 is a flow diagram showing a manufacturing method of microwave dielectric ceramics in accordance with the present invention.

In describing and claiming the present invention, the following terminology will be used according to the definitions hereunder.

As used herein, "liquid phase sintering" refers to a sintering process in which part of multiple powders and at least one sintering aid is blended and melted to produces a viscous glassy liquid. The process accelerates combination rates and decrease porosity to attain a high density sinter With reference to FIG. 1, the present invention provides a method for manufacturing microwave dielectric ceramics comprising steps of: (a) mixing and sintering multiple A-metal compounds to form a first component; (b) mixing and calcining multiple B-metal compounds to form a second component; and (c) mixing and sintering the first and second components with at least one sintering aid to form the microwave dielectric ceramics.

The step of (a) mixing and sintering multiple A-metal compounds to form a first component is performed between 1350° C. and 1450° C. for two to four hours (2 to 4 hours) to form a first component being $Ba_{5+y}(Nb_{1-k}Mn_k)_4O_{15}$.

The A-metal compounds are Barium-carbonate ($BaCO_3$), Niobium-oxide ($Nb_2O_5$) and Manganese-oxide ($MnO_2$). The $BaCO_3$ may be about 99.9% pure. The $Nb_2O_5$ be about 99.7% pure. The $MnO_2$ may be about 99.5% pure.

The A-metal compounds are $BaCO_3$ (purity 99.9%), $Nb_2O_5$ (purity 99.7%), $MnO_2$ (purity 99.5%) and are mixed in correct ratios to form a first mixture of $Ba_{5+y}(Nb_{1-k}Mn_k)_4O_{15}$, wherein y and k are molar fractions and $0 < y \leq 0.3$ and $0 \leq k \leq 0.1$.

Deionized water and Yttrium Toughened Zirconia (YTZ) balls are added to the first mixture and mixed for 24 hours, then dried at about 120° C. The first mixture is placed on an alumina crucible for calcining. A heat profile of the sintering is increasing a temperature by 5° C./min until 1150° C. and maintaining said temperature for about 2 hours. X-ray diffraction (XRD) may be used to confirm the mixture has $Ba_5Nb_4O_{15}$ crystals. Then deionized water and YTZ balls are mixed for 24 hours and dried in 120° C. before being ground, screened and granulated to make a first green. The first green, may be about 10 mm in diameter and about 5 mm in height, is sintered between 1350° C. to 1450° C. for 2 to 4 hours to form the first component being $Ba_{5+y}(Nb_{1-k}Mn_k)_4O_{15}$.

In the step of (b), mixing and calcining multiple B-metal compounds may be performed between 1350° C. and 1450° C. for two to four hours (2 to 4 hours) to form the second component being $Ba_{1+z}Nb_2O_6$.

The B-metal compounds are $BaCO_3$ (purity 99.9%) and $Nb_2O_5$ (purity 99.7%), and are mixed in correct ratios to form a second mixture of $Ba_{1+z}Nb_2O_6$, wherein z is a mole fraction and $0 \leq z \leq 0.3$.

The $BaCO_3$ may be 99.9% pure. The $Nb_2O_5$ may be 99.7% pure.

Deionized water and YTZ balls are added to the second mixture and mixed for 24 hours, then dried at around 120° C. The second mixture is placed on an alumina crucible to proceed with calcining. A heating profile of the sintering is increasing a temperature by 5° C./min until 1150° C. and maintaining said temperature for about 2 hours. XRD may be used to confirm the mixture has $BaNb_2O_6$ crystals. Then deionized water and YTZ balls are mixed for 24 hours and dried in 120° C. before being ground, screened and granulated to make a second green. The second green, may be about 10 mm in diameter and about 5 mm in height, is sintered between 1350° C. to 1450° C. for two to four hours to form a second component being $Ba_{1+z}Nb_2O_6$.

In the step of (c), mixing and sintering the first and second components with at least one sintering aid to form a third component, the third component is $(1-x)Ba_{5+y}(Nb_{1-k}Mn_k)_4O_{15} \cdot xBa_{1+z}Nb_2O_6$; wherein x is a molar fraction and $0 \leq x < 1$ and the sintering aid is 0.3~2.8 wt %.

The sintering aid may be selected from the group comprising $B_2O_3$, $B_2O_3$—ZnO, $B_2O_3$—CuO, $B_2O_3$—BaO BaO—$B_2O_3$—CuO.

The first and second components and the at least one sintering aid sare prepared as a third mixture. Deionized water and YTZ balls are added to the third mixture, mixed for 8 hours, then dried in 120° C., then are ground, screened and granulated with an uniaxial pressure of one ton to form a third green. The third green, may be about 10 mm in diameter and about 5 mm in height, is sintered between 860° C. to 950° C. for 2 hours to make a third component $(1-x)Ba_{5+y}(Nb_{1-k}Mn_k)_4O_{15}\text{-}xBa_{1+z}Nb_2O_6$.

The following examples further illustrate the present invention but are not to be construed as limiting the invention as defined in the claims appended hereto.

(1) Measuring Method (a) Crystal Size Analysis

A scattering equipment having a refractive index set to 1.96 and absorption set to 1 is used to indirectly measure crystal size by measuring changes in frequency, angle, polarization and scattered light intensity then, using electrodynamics and statistical mechanics analysis to attain information about molecular mechanics and molecular structure.

(b) Percentage Theoretical Density Analysis

The Archimedes method is used to measure density of crystals. The crystal is immersed in deionized water in a vacuum bottle and air is draw out using a vacuum to attain a weight containing water (Wb) and weight in water (Wc). Then, the crystal is dried and measured to attain a dry weight (Wa), wherein the density (D)=Wa/(Wb=Wc). Then, the density (D) is divided by theoretical density ($Ba_5Nb_4O_{15}$=6.29 gw/cm$^3$) to attain a percentage theoretical density (T.D. %).

(c) Crystal Structure Analysis

Continuous scanning (CS method) is applied at scanning angles from 20° to 60° at a speed of 4°/min and each 0.02° an X-ray diffraction intensity graphic is produced. The X-ray diffraction (XRD) intensity graphics are compared with the Joint Committee on Powder Diffraction Standards (JCPDS) data to decide on the crystal class of the crystal.

(d) Microstructure Observation

The microstructure of the crystal is observed by scanning electron microscopy (SEM, Joel JSM 6360). The sample is ground, polished, dispersed and put into an electrical furnace for heat etching. Conditions of heat etching are 50 to 100° C. for about 0.5 to 2 hours. Next, the sample plates are sputtered with gold.

(d) Measuring Quality Factor (Q*f)

Using the cylindrical frequency resonant cavity method the quality factor (Q*f) and dielectric constant (K) of the ceramics are obtained. A network analyzer (HP8722ES) analysis the ceramics and collocate with a temperature control box (KSON labtester) to measure the resonant frequency at 0° C., 25° C., 50° C. and 85° C. Using, the resonance frequency at 25° C. as a standard ($f_{25}$), the value of the temperature coefficient of the resonant frequency ($\tau_f$) is calculated using the following formula:

$$\tau_f = \frac{1}{f_{25}} \frac{\partial f}{\partial T}$$

EXAMPLE 1

Analysis of the First Component $Ba_{5+y}(Nb_{1-k}Mn_k)_4O_{15}$

The A-metal compounds were purified by calcination at 1150° C. calcination temperature (C.T) for 2 hours to rarefy the A-metal compounds and sintered at 1450° C. for 2 to hours to make a first component $Ba_{5+y}(Nb_{1-k}Mn_k)_4O_{15}$. Properties of component 1, $Ba_{5+y}(Nb_{1-k}Mn_k)_4O_{15}$, are described in the following tables 1 and 2.

TABLE 1

| $Ba_{5+y}Nb_4O_{15}$ | Density | Microwave dielectric properties | | | |
|---|---|---|---|---|---|
| | | $\epsilon$ | F | Q*f | $\tau_f$ |
| y = 0.01 | 5.79 | 38 | 5.45 | 21822 | 37.6 |
| y = 0.02 | 5.83 | 40 | 5.05 | 39708 | 52.1 |
| y = 0.03 | 6.06 | 40.5 | 5.08 | 42195 | 60.9 |
| y = 0.04 | 5.92 | 39.5 | 5.08 | 38115 | 48.5 |
| y = 0.05 | 6.08 | 40.5 | 5.09 | 30000 | 66.9 |
| y = 0.1 | 5.98 | 39.1 | 4.92 | 28723 | 66 |

TABLE 2

| $Ba_5(Nb_{1-k}Mn_k)_4O_{15}$ | Density | Microwave dielectric properties | | |
|---|---|---|---|---|
| | | $\epsilon$ | Q*f | $\tau_f$ |
| k = 0 | 5.94 | 38 | 23650 | 78 |
| k = 0.002 | 5.79 | 32 | 34250 | 51 |
| k = 0.005 | 5.83 | 37 | 33462 | 65 |
| K = 0.01 | 6.06 | 35.5 | 22506 | 45 |
| k = 0.02 | 5.92 | 31 | 6273 | 42 |

As seen in tables 1 and 2, the density and the microwave dielectric properties of the first component $Ba_{5+y}(Nb_{1-k}Mn_k)_4O_{15}$ raised as the barium content was increased. When y=0.03, the density and the microwave dielectric properties peak. The percent of theoretic density (T.D. %) was above 95% (T.D. %), K=40~41, Q*f>40000 and $\tau_f$=60 ppm/° C. However, adding manganese shows no marked improvement for material properties. However, adding manganese slightly decreased the temperature coefficient of the resonant frequency ($\tau_f$), but adding manganese apparently decreased the density, dielectric constant and quality factor. Therefore, $Ba_{5.03}Nb_4O_{15}$ has the best microwave properties.

EXAMPLE 2

Low Sintering Temperature of the First Component $Ba_{5.03}Nb_4O_{15}$

Generally speaking, the sintering aid can be classified into two types, glass with low melting point and metal oxide with low melting point. The glass sintering aids reduce a melting point of the material but simultaneously lower microwave dielectric properties. The metal oxide sintering aids reduce the melting point of the material without lowering microwave dielectric properties. Therefore, the present invention uses metal oxide sintering aids to lower the melting point of the microwave dielectric ceramics.

The metal oxide sintering aids are preferably selected from the group consisting of $B_2O_3$, CuO, ZnO and $V_2O_5$. BaO, $B_2O_3$ and CuO can cause a eutectic mixture, for example, CuO forms a liquid phase $BaCu(B_2O_5)$ at 875° C. Therefore, using the liquid phase $BaCu(B_2O_5)$ and adding metal oxide powder such as $B_2O_3$—CuO and ZnO—$B_2O_3$ can lower the sintering temperature (S.T.) to form $Ba_{5.03}Nb_4O_{15}$. The $Ba_{5.03}Nb_4O_{15}$ data is described in the following table 3.

TABLE 3

| Composition | Sintering aid | S.T. | Density | ε | Q*f | $\tau_f$ |
|---|---|---|---|---|---|---|
| $Ba_{5.03}Nb_4O_{15}$ | $0.3B_2O_3$:0.3ZnO | 900° C./2 h | 5.986 | 40.84 | 9483 | 65 |
| | $0.3B_2O_3$:0.3CuO | 900° C./2 h | 6.068 | 40.69 | 16674 | 62 |
| | $0.3B_2O_3$:0.3CuO:1.5BaO | 900° C./2 h | 6.014 | 41.1 | 18953 | 52 |
| $Ba_{5.05}Nb_4O_{15}$ | $0.3B_2O_3$:0.3CuO | 900° C./2 h | 6.056 | 40.71 | 16657 | 70 |
| | $0.3B_2O_3$:0.3Li_2O | 900° C./2 h | 5.892 | 38.02 | 17498 | 66 |
| $Ba_{5.10}Nb_4O_{15}$ | $0.3B_2O_3$:0.3CuO | 900° C./2 h | 6.073 | 41.4 | 17024 | 65 |

According to table 3, when a weight ratio of $B_2O_3$—CuO is 0.6 wt % the microwave dielectric properties peak. Comparing BaO—$B_2O_3$—CuO and $B_2O_3$—CuO, BaO—$B_2O_3$—CuO is preferred over $B_2O_3$—CuO due to the lower sintering temperature (less than 900° C). Therefore, the weight ratio of $Ba_{5.03}Nb_4O_{15}$:BaO:$B_2O_3$:CuO is 1:0.5:0.4:0.2 can attain better microwave dielectric properties (S.T<900° C., K=40~41, Q*f>18000, $\tau_f$~50 ppm/° C.).

EXAMPLE 3

Different $Ba_{1+z}Nb_2O_6$ Content to Regulate Temperature Coefficient

Tables 4a and 4b, below, show the sintering temperature and microwave dielectric properties of $(1-x)Ba_{5+y}(Nb_{1-k}Mn_k)_4O_{15}$-$xBa_{1+z}Nb_2O_6$ at different BaO contents.

TABLE 4a

| | S.T | Microwave dielectric properties | | |
|---|---|---|---|---|
| | | ε | Q*f | $\tau_f$ |
| $0.95Ba_{5.03}Nb_4O_{15}$ + $0.05BaNb_2O_6$ + 0.3 wt % $B_2O_3$ + 1.5 wt % BaO | 925° C./2 h | 37.4 | 19993 | 52 |
| $0.9Ba_{5.03}Nb_4O_{15}$ + $0.1BaNb_2O_6$ + 0.3 wt % $B_2O_3$ + 2.0 wt % BaO | 925° C./2 h | 40 | 30768 | 42 |
| $0.84Ba_{5.03}Nb_4O_{15}$ + $0.16Ba Nb_2O_6$ + 0.3 wt % $B_2O_3$ + 2.5 wt % BaO | 925° C./2 h | 39.4 | 21730 | 33 |

TABLE 4b

| Dielectric ceramic | S.T ° C. | Microwave dielectric properties | | |
|---|---|---|---|---|
| | | ε | Q*f | $\tau_f$ |
| $0.95Ba_{5.03}Nb_4O_{15}$ + $0.05Ba_{1.1}Nb_2O_6$ + 0.3 wt% $B_2O_3$ + X wt % BaO | | | | |
| X = 0.3 | 925° C./2 h | 41.6 | 11983 | 44 |
| X = 0.5 | 925° C./2 h | 41.4 | 13147 | 47 |
| X = 1.0 | 925° C./2 h | 41.1 | 13114 | 45 |
| X = 1.5 | 925° C./2 h | 40.5 | 25218 | 47 |
| $0.9Ba_{5.03}Nb_4O_{15}$ + $0.1Ba_{1.1}Nb_2O_6$ + 0.3 wt % $B_2O_3$ + X wt % BaO | | | | |
| X = 0.5 | 925° C./2 h | 41.5 | 10695 | 35 |
| X = 1.0 | 925° C./2 h | 41.3 | 10855 | 36 |

TABLE 4b-continued

| Dielectric ceramic | S.T ° C. | Microwave dielectric properties | | |
|---|---|---|---|---|
| | | ε | Q*f | $\tau_f$ |
| X = 1.5 | 925° C./2 h | 40.8 | 13346 | 40 |
| X = 2.0 | 925° C./2 h | 41.1 | 13136 | 38 |
| X = 2.5 | 925° C./2 h | 36.7 | 17024 | 39 |
| $0.84Ba_{5.03}Nb_4O_{15}$ + $0.16Ba_{1.1}Nb_2O_6$ + 0.3 wt % $B_2O_3$ + X wt % BaO | | | | |
| X = 0.3 | 925° C./2 h | 41.9 | 10459 | 28 |
| X = 0.5 | 925° C./2 h | 41.7 | 7094 | 29 |
| X = 1.0 | 925° C./2 h | 41.6 | 9485 | 31 |
| X = 1.5 | 925° C./2 h | 41.4 | 10428 | 35 |
| X = 2.0 | 925° C./2 h | 40.1 | 12990 | 33 |
| X = 2.5 | 925° C./2 h | 40.3 | 13232 | 25 |

Using $Ba_{1+z}Nb_2O_6$ and $B_2O_3$—CuO to decrease temperature coefficient can seriously decrease quality factor therefore, temperature coefficient should decreased using BaO—$B_2O_3$. Furthermore, adding $Ba_{1.1}Nb_2O_6$ has the best effect. Adding $Ba_{1.1}Nb_2O_6$ can decrease temperature coefficient and increase quality factor. When $Ba_{1.1}Nb_2O_6$ is 0.16 mole % and BaO is 2.6 wt %, the temperature coefficient is at a minimum and the quality factor is at a maximum. Therefore, the best conditions are sintering 0.84 $Ba_{5.03}Nb_4O_{15}$, 0.16 $Ba_{1.1}Nb_2O_6$, 0.3 wt % $B_2O_3$ and 2.5 wt % BaO to obtain following microwave dielectric properties: K=40.3, $Q*f$=13232, $\tau_f$=+$^{25}$ ppm/° C. and S.T.=925° C./2 h.

Based on the above mentioned, adding oxide into the microwave dielectric ceramics can obtain higher percent of the theoretic density at lower sintering temperature. But, the effect of adding the $BaNb_2O_6$ increases the percent of the theoretic density very slightly.

Regarding the percentage theoretical density (TD %), adding sintering aid having low melting point can achieve high percentage theoretical density at low sintering temperature. However, adding $BaNb_2O_6$ does not increase apparently the percentage theoretical density.

Regarding the quality factor, adding BaO can efficiently increase the quality factor of the material and the quality factor has a highest value ($Q*f$=42195) when the molar fraction is $Ba_{5.03}Nb_4O_{15}$. In addition, adding sintering aids such as BaO—$B_2O_3$—CuO can obtain a high the quality factor ($Q*f$=20592) and low sintering temperature (less than 900° C.). However, adding $BaNb_2O_6$ can decrease the quality factor ($Q*f$) of the material so BaO—$B_2O_3$ is chosen to reduce the sintering temperature. When the sintering aids are BaO and $B_2O_3$ respectively of 2.5 wt % and 0.3 wt %, the quality factor ($Q*f$) has the most preferably value ($Q*f$=33880).

Regarding the dielectric constant (K), the dielectric constant (K) is effected by the percent of the theoretic density in principle. However, adding the sintering aid makes $Ba_{5.03}Nb_4O_{15}$ gives a preferable percentage of theoretic density at the lower sintering temperature. Moreover, adding the sintering aid only has a little impact on the dielectric constant and the dielectric constant (K) above 40. However, adding $BaNb_2O_6$ can make the sintering temperature increase. Therefore, the dielectric constant (K) is 39.5 when the sintering temperature is 925° C.

Regarding the temperature coefficient of the resonant frequency ($\tau_f$), adding $BaNb_2O_6$ decreases effectively $\tau_f$ value and adding $Ba_{1.1}Nb_2O_6$ decreases $\tau_f$ value more effectively than adding $BaNb_2O_6$ does. When the content of $Ba_{1.1}Nb_2O_6$ is 0.16 mole %, the temperature coefficient of the resonant frequency ($\tau_f$) is a minimum (~25).

The microwave dielectric ceramics of $(1-x)Ba_{5+y}(Nb_{1-k}Mn_k)_4O_{15}-xBa_{1+z}Nb_2O_6$ in accordance with the present invention has superior quality factor at lower sintering temperature (less than 900° C.). Therefore, microwave dielectric ceramics of $(1-x)Ba_{5+y}(Nb_{1-k}Mn_k)_4O_{15}-xBa_{1+z}Nb_2O_6$ is the preferred material.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A microwave dielectric ceramic formed with at least one sintering aid comprising a main component of the formula

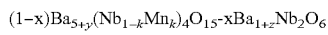

wherein x, y, z and k are molar fractions and $0 \leq x < 1$, $0 < y \leq 0.3$, $0 \leq z \leq 0.3$, $0 \leq k \leq 0.1$.

2. The microwave dielectric ceramic as claimed in claim 1, wherein the sintering aid is selected from the group consisting of $B_2O_3$, BaO, ZnO, $Li_2O$ and CuO.

3. The microwave dielectric ceramics as claimed in claim 2, wherein the two sintering aids being $B_2O_3$ and BaO are implemented, respectively in ratios of 0.3 wt % to 3 wt %.

4. A method for manufacturing microwave dielectric ceramics, comprising the steps of:
 (a) mixing and sintering multiple A-metal compounds between 1350~1450° C. for 2~4 hr to make a first component $Ba_{5+y}(Nb_{1-k}Mn_k)_4O_{15}$;
 (b) mixing and calcining multiple B-metal compounds to make a second component $Ba_{1+z}Nb_2O_6$;
 (c) mixing the first component $Ba_{5+y}(Nb_{1-k}Mn_k)_4O_{15}$ and the second component $Ba_{1+z}Nb_2O_6$ with at least one sintering aid to make a third component $(1-x)Ba_{5+y}(Nb_{1-k}Mn_k)_4O_{15}-xBa_{1+z}Nb_2O_6$;
 wherein x, y, z and k are molar fractions and $0 \leq x < 1$, $0 < y \leq 0.3$, $0 \leq z \leq 0.3$, $0 \leq k \leq 0.1$; and the sintering aid is 0.3~3 wt %.

5. The method for manufacturing microwave dielectric ceramic as claimed in 4, wherein the ratio of x:y:z is 0.16:0.03:0.1.

6. The method for manufacturing microwave dielectric ceramics as claimed in 4, wherein the at least one sintering aid is selected from the group consisting of $B_2O_3$, BaO, ZnO, $Li_2O$ and CuO.

7. The method for manufacturing microwave dielectric ceramics as claimed in 5, wherein the at least one sintering aid is selected from the group consisting of $B_2O_3$, BaO, ZnO, $Li_2O$ and CuO.

8. The method for manufacturing microwave dielectric ceramics as claimed in 6, wherein two sintering aids are implemented being $B_2O_3$ and BaO.

9. The method for manufacturing microwave dielectric ceramics as claimed in 7, wherein two sintering aids are implemented being $B_2O_3$ and BaO.

10. The method for manufacturing a microwave dielectric ceramics as claimed in 8, wherein the respective ratios of $B_2O_3$ and BaO are 0.3 wt % and 2.5 wt %.

11. The method for manufacturing a microwave dielectric ceramics as claimed in 9, wherein the respective ratios of $B_2O_3$ and BaO are 0.3 wt % and 2.5 wt %.

* * * * *